United States Patent [19]
Verbiscar

[11] 3,876,661
[45] Apr. 8, 1975

[54] CARBAMATE ESTERS OF SEROTONIN AND ANALOGS

[76] Inventor: Anthony J. Verbiscar, 160 E. Montecito Ave., Sierra Madre, Calif. 91024

[22] Filed: May 4, 1973

[21] Appl. No.: 357,258

Related U.S. Application Data

[63] Continuation-in-part of Ser. No. 120,304, March 2, 1971, abandoned, which is a continuation-in-part of Ser. No. 636,650, May 8, 1967, Pat. No. 3,600,427, which is a continuation-in-part of Ser. No. 338,289, Jan. 17, 1964, abandoned.

[52] U.S. Cl.................. 260/326.14 R; 424/274
[51] Int. Cl............................................ C07d 27/56
[58] Field of Search ..................... 260/326.14 R

[56] References Cited
UNITED STATES PATENTS
3,676,492   7/1972   Biel et al.................. 260/326.14 X Primary Examiner—Joseph A. Narcavage
Attorney, Agent, or Firm—Mason, Kolehmainen, Rathburn & Wyss

[57] ABSTRACT

Carbamate esters of serotonin and the 5-benzyl derivative of serotonin are described wherein the ester moiety is a radical which is readily hydrolyzed in biological media to provide serotonin or 5-benzylserotonin at a site within the body of a mammal where the amine exerts activity on the central nervous system or cerebral cortex. In these carbamates the ester moiety is an aromatic radical such as phenyl and phenyl substituted with activating groups such as carbalkoxy or nitro groups, or carbalkoxyalkyl groups.

14 Claims, No Drawings

CARBAMATE ESTERS OF SEROTONIN AND ANALOGS

CROSS REFERENCE TO RELATES APPLICATIONS

This application is a continuation-in-part of my copending application Ser. No. 120,304 filed Mar. 2, 1971 now abandoned, which is a continuation-in-part of my application Ser. No. 636,650 filed May 8, 1967, now U.S. Pat. No. 3,600,427, which is a continuation-in-part of my application Ser. No. 338,289 filed Jan. 17, 1964, now abandoned.

This invention relates to serotonin carbamate esters and derivatives thereof which are physiologically useful as serotonin-transporting agents.

BRIEF SUMMARY OF THE INVENTION

The carbamate esters which comprise this invention are represented by the following general structural formula

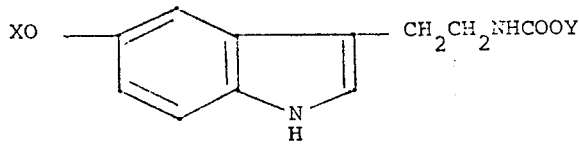

wherein X is hydrogen or benzyl, and Y is phenyl, nitrophenyl, lower alkoxycarbonylphenyl (e.g., carbomethoxyphenyl), lower alkoxycarbonylalkyl (e.g., α-carbethoxyethyl) and lower alkoxycarbonylbenzyl (e.g., α-carbethoxybenzyl), wherein the alkyl radicals contain one to four carbon atoms. These compounds are derivatives of serotonin which is a physiologically active amine, particularly as a vasoconstrictor, which occurs in the blood serum and gastric mucosa of mammals. Serotonin also occurs in small amounts in the brain and in secretions of various amphibians and it is formed in animal tissues from tryptophan.

DETAILED DESCRIPTION OF THE INVENTION

As explained more fully in my application Ser. No. 636,650, now U.S. Pat. No. 3,600,427, which is incorporated herein by reference, it is possible to make physiologically active amines available at the proper site in mammals for biological activity by modifying such amines to produce carbamates which in vivo liberate the parent physiologically active amine at the appropriate site in mammals. This is achieved by converting physiologically active amine into certain relatively easily hydrolisable carbamates whereby it is possible to control the selective absorption, penetration rate or release of the physiologically active amine and achieve prolongation of drug action at preselected sites in mammals. These ends are accomplished by converting the physiologically active amines into carbamates which can be selected to affect lipoid solubility, as well as solubility in other body fluids. When the carbamate reaches the preselected site, it is hydrolyzed physiologically to release the amine so that the latter may exert its physiological influence at that site.

The Y radicals which have been selected for the serotonin carbamate ester moieties and analogs thereof are those containing an aromatic, preferably a substituted aromatic, ring, or aliphatic radicals substituted with an activating group such as a carbalkoxyl group.

In the formula given above, Y can be o-, m- and p-nitrophenyl; o-, m- and p-carboalkoxyphenyl, wherein the alkyl radical is methyl, ethyl, propyl or butyl; α-carbalkoxybenzyl, wherein the alkyl radical is methyl, ethyl, propyl or butyl; α-carbalkoxyalkyl, represented by the formula

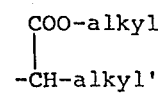

wherein the two alkyl radicals may be the same or different and contain one to five carbon atoms.

The compounds of this invention are physiologically active. They are particularly useful as muscle relaxants and as analgesics. They are effective in doses up to 50 milligrams per kilogram administered intraperitoneally. They also exhibit tranquilizing properties at such dosage levels.

The invention is disclosed in more detail by means of the following examples which are provided for purposes of illustration only. It will be understood by those skilled in the art that various modifications in reagents, operating conditions and the like may be made within the scope of the invention as disclosed herein.

EXAMPLE 1

Phenyl β-(5-hydroxy-3-indolyl)ethylcarbamate 1,4-diazabicyclo[2.2.2] octane salt A mixture of 105 mg. of 5-hydroxytryptamine hydrogen oxalate, 80 mg. of sodium carbonate, 80 mg. of phenyl chloroformate, 2 ml. of water and 5 ml. of ethyl acetate was shaken vigorously for one hour, whereupon the two layers became clear. There was added 3 ml. of water and 7 ml. of ethyl acetate and the organic phase was separated. It was washed with 5% hydrochloric acid followed by 5% sodium bicarbonate solution and dried over sodium sulfate. Forty-five milligrams of 1,4-diazabicyclo[2.2.2]octane (DBO) were added to the filtered solution and the solvent was evaporated. Recrystallization of the residue from dry benzene with an excess of DBO give 110 mg. of fine white plates, m.p. 123°–125°C., which were homogeneous of thin layer chromatography. The compound has the formula

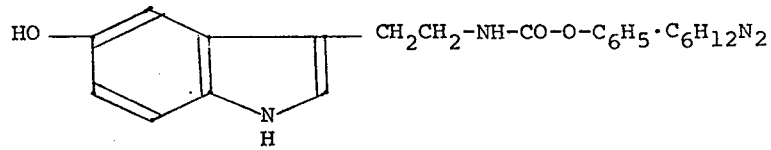

At a dosage of 100 mg./kg. intraperitoneally in propylene glycol in rats, this compound produced light to moderate tranquilization.

EXAMPLE 2 o-Carbomethoxyphenyl β-(5-benzyloxy-3-indolyl)ethylcarbamate

A solution of 1.55 g. of o-carbomethoxyphenyl chloroformate in 50 ml. of chloroform was added to a suspension of 2.0 g. of 5-benzyloxytryptamine hydrochloride in 20 ml. of water containing 0.74 g. of sodium carbonate. The mixture was stirred at room temperature for 3.5 hours then at 50°–60° C. for 0.5 hours. After removal of 500 mg. of unreacted 5-benzyloxytryptamine hydrochloride the organic phase was separated, washed with 5% hydrochloric acid, then water and dried over sodium sulfate. Evaporation of the solvent left an oil. This was crystallized from carbon tetrachloride and then recrystallized from toluene to give 530 mg. of small white needles, m.p. 102.5°–103.5° C., which were homogeneous on thin layer chromatography. Its infrared spectrum in potassium bromide has peaks at 2.93 and 3.04 microns representing N-H absorption, and an askew peak at 5.81 microns corresponding to the two carbonyl functions. It has the formula

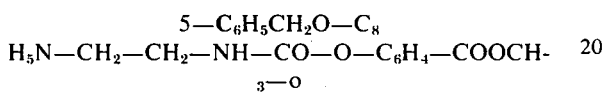

$5—C_6H_5CH_2O—C_8H_5N—CH_2—CH_2—NH—CO—O—C_6H_4—COOCH_3—o$

EXAMPLE 3 o-Carbomethoxyphenyl β-(5-hydroxy-3-indolyl)ethylcarbamate

Method A:

A 200-mg. quantity of o-carbomethoxyphenyl β-(5-benzyloxy-3-indolyl)ethylylcarbamate in 15 ml. of ethyl acetate was hydrogenated at atmospheric pressure for 4 hours using 200 mg. of 5 percent palladium on charcoal catalyst. The catalyst was removed and the solvent evaporated to give a semi-solid residue. Trituration with a small amount of isopropyl ether caused the residue to become more crystalline. A thin layer chromatogram or Merck silica gel G with a 9:1 benzene:ethanol developer showed the product to be homogeneous with an $R_f$ value of 0.21. An infrared spectrum in chloroform had peaks at 2.87 and 2.90 microns due to N-H absorption, an askew peak at 5.76 microns corresponding to the two carbonyl functions, and peaks at 6.13, 6.20, 6.29 and 6.73 microns due to the indolyl and aromatic rings. The compound has the formula

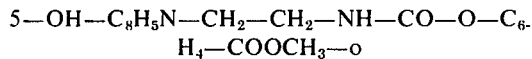

$5—OH—C_8H_5N—CH_2—CH_2—NH—CO—O—C_6H_4—COOCH_3—o$

Method B:

A mixture of 100 mg. of serotonin hydrogen oxalate, 106 mg. of sodium carbonate, 140 mg. of o-carbomethoxyphenyl chloroformate, 2 ml. of water and 10 ml. of ethyl acetate was shaken vigorously for one hour and worked up in the usual manner. A solid product was isolated, m.p. 70°–80° C., which was only partially soluble in chloroform. Its infrared spectrum was comparable to the one above and its $R_f$ value on thin layer chromatography was identical.

EXAMPLE 4 p-Nitrophenyl β-(5-hydroxy-3-indolyl)ethylcarbamate

A mixture of 105 mg. of serotonin hydrogen oxalate, 80 mg. of sodium carbonate, 90 mg. of p-nitrophenyl chloroformate, 2 ml. of water and 5 ml. of ethyl acetate was shaken vigorously for 0.5 hours. The mixture was diluted with 3 ml. of water and 10 ml. of ethyl acetate and separated. The organic phase was washed successively with 5-ml. portions of water, 5 percent hydrochloric acid, then water and dried over sodium sulfate. A silver nitrate test was negative. Evaporation of the solvent gave an oil which was purified by dissolving in a few drops of ethyl acetate and precipitating with isopropyl ether to remove free p-nitrophenol. The resulting semi-solid was extremely labile toward hydroxylic solvents. On thin layer chromatography it has an $R_f$ value of 0.22–0.26 using Merck silica gel G and 8:2 benzene:ethyl acetate developer. It has the formula

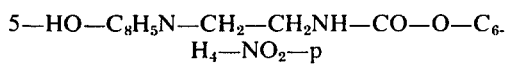

$5—HO—C_8H_5N—CH_2—CH_2NH—CO—O—C_6H_4—NO_2—p$

EXAMPLE 5 o-Nitrophenyl β-(5-hydroxy-3-indolyl)ethylcarbamate

A 110 mg. quantity of o-nitrophenol was converted to its chloroformate in the normal manner and added to a mixture of 105 mg. of serotonin hydrogen oxalate, 80 mg. of sodium carbonate, 2 ml. of water and 5 ml. of ethyl acetate. After shaking for 1.5 hours, the mixture was diluted with 3 ml. of water and 7 ml. of ethyl acetate and separated. The organic phase was washed with 5ml. portions of water, 5 percent hydrochloric acid, then water and dried over sodium sulfate. A silver nitrate test for chloroformate was negative. Evaporation of the solvent gave a yellow oil which was taken up in 0.5 ml. of ethyl acetate and precipitated by the addition of 10 ml. of hexane. This purification was repeated to give a gummy product that was highly labile toward hydroxylic solvents. On thin layer chromatography it had an $R_f$ value of 0.29 using Merck silica gel G with a 9:1 benzene:ethanol developer. It has the formula

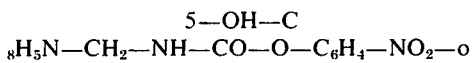

$5—OH—C_8H_5N—CH_2—NH—CO—O—C_6H_4—NO_2—o$

EXAMPLE 6

α-Carbethoxyethyl β-(5-benzyloxy-3-indolyl)ethylcarbamate

This compound was prepared essentially by the method described in Example 2 using 1.21 grams of 5-benzyloxytryptamine hydrochloride and 1.08 grams of α-carbethoxyethylchloroformate instead of o-carbomethoxyphenyl chloroformate. The product was obtained as a colorless oil weighing 1.63 grams. It was homogeneous on thin layer chromatography using Merck silica gel G and 95:5 benzene:methanol developer with an $R_f$ 0.76.

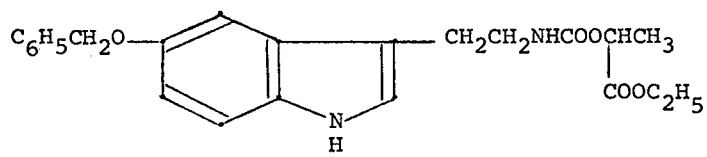

EXAMPLE 7

α-Carboethoxyethyl β-(5-hydroxy-3-indolyl)ethylcarbamate

A solution of 1.66 g. of α-carbethoxyethyl β-(5-benzyloxy-3-indolyl)ethylcarbamate in 70 ml. of ethanol was shaken with 700 mg. of 5 percent palladium on charcoal catalyst and 33 psi. of hydrogen for 15 hours. The catalyst was filtered and the solvent was removed under vacuum leaving 1.1 gram of an oil. The oil darkens quickly in air, is insoluble in isopropyl ether and soluble in hot benzene. A thin layer chromatogram on Eastman 6060 chromagram sheet using 95:5 benzene:methanol developer and iodine detection gave a single spot at $R_f$ 0.48-0.55.

A 1,4-diazabicyclo[2.2.2]octane salt formed in benzene + isopropyl ether precipitating as a white crystalline product, m.p. 176°-9°.

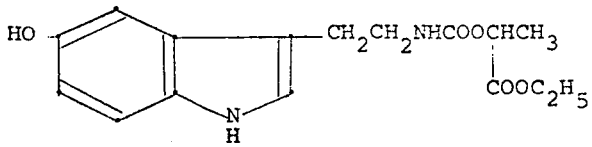

EXAMPLE 8

Benzyl β-(5-benzyloxy-3-indolyl)ethylcarbamate

A solution of 600 mg. of 5-benzyloxytryptamine hydrochloride in 120 ml. of water was made basic to free the amine. The amine was extracted into 100 ml. of chloroform and to this solution was added 680 mg. of benzylchloroformate in toluene and 300 mg. of sodium carbonate in 10 ml. of water. After stirring the mixture for two hours the chloroform phase was separated and dried over sodium sulfate anhydrous. Evaporation of the solvent left an oil which was insoluble in isopropyl ether. The oil was dissolved easily in carbon tetrachloride and precipitated by the addition of pet ether. In this manner 560 mg. of benzyl β-(5-benzyloxy-3-indolyl) ethylcarbamate was obtained as an oil. The compound was homogeneous on thin layer chromatography with an $R_f$ 0.74 using Merck silica gel G and 95:5 benzene:methanol developer.

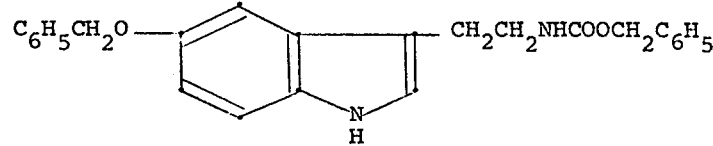

EXAMPLE 9

α-Carbomethoxybenzyl β-(5-benzyloxy-3-indolyl)ethylcarbamate

A 600 mg. of quantity of 5-benzyloxytryptamine hydrochloride was reacted with 470 mg. of α-carbomethoxybenzyl chloroformate as in 8. Workup yielded an oil which was insoluble in isopropylether but very soluble in carbon tetrachloride. The oil was homogeneous on thin layer chromatography with an $R_f$ 0.74 on Merck silica gel G using 95:5 benzene:methanol developer.

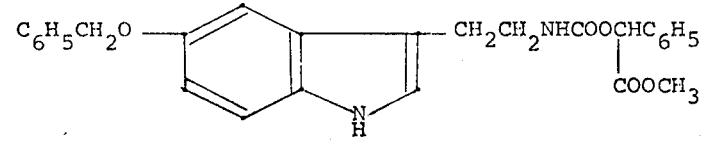

Example 10 p-Methoxyphenyl β-(5-hydroxy-3-indolyl)ethylcarbamate

A mixture of 105 mg of 5-hydroxytryptamine hydrogen oxalate, 150 mg of p-methoxyphenyl chloroformate, 105 mg of potassium carbonate, 3 ml of water and 9 ml of ethanol was stirred for 80 minutes at room temperature. An inorganic precipitate was removed by filtration and the solvent was evaporated under vacuum. The residue was extracted with ethanol, filtered, and the solvent was evaporated to dryness. The resulting dark gummy residue containing a small amount of unreacted 5-hydroxytryptamine as well as the carbamate was extracted with ethyl ether in which the carbamate is only slightly soluble. Evaporation of the ether left 40 mg of tan crystals of p-methoxyphenyl β-(5-hydroxy-3-indolyl)ethylcarbamate m.p. 147°-151°. This compound is insoluble in dilute hydrochloric acid and give a positive ferric chloride test. It is homogeneous on thin layer chromatography, having an $R_f$ 0.43 on Merck silica gel G as the absorbent, 4:1 toluene:ethanol developer, and iodine vapor detection.

2-Methyl-2-nitropropyl β-(5-hydroxy-3-indolyl)ethylcarbamate

A mixture of 105 mg of 5-hydroxytryptamine hydrogen oxalate, 190 mg of 2-methyl-2-nitropropyl chloroformate, 105 mg of potassium carbonate, 2 ml of water and 3 ml of ethanol was stirred for 1 hour at room temperature. An inorganic precipitate was filtered off and the solvent was evaporated to dryness under vacuum. The oily residue was extracted with ethyl ether several times, and the ether extract was evaporated, leaving an oil. The oil was extracted with a small volume of isopropyl ether, which deposited a gummy oil, 2-methyl-2-nitropropyl β-(5-hydroxy-3-indolyl)ethylcarbamate, upon the addition of petroleum ether. This compound is insoluble in dilute hydrochloric acid and gave a positive test with ferric chloride. It is estimated to be about 95 percent pure by thin layer chromatography on Merck silica gel G with an $R_f$ 0.41 with a 10:1 isopropyl:ethanol developer, and an $R_f$ 0.20 with a 10:1 toluene:ethanol developer with iodine vapor detection.

I claim:
1. A compound of the formula

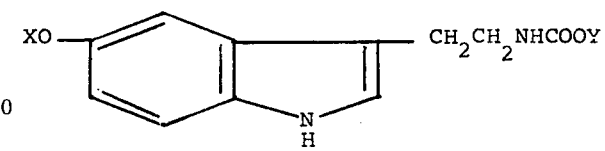
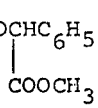

wherein X is hydrogen or benzyl, and Y is phenyl, nitrophenyl, lower nitroalkyl, methoxyphenyl, lower alkoxycarbonylphenyl, lower alkoxycarbonylalkyl and lower alpha-alkoxycarbonylbenzyl, wherein the alkyl radicals contain one to four carbon atoms.

2. A compound as defined by claim 1 wherein X is H.
3. A compound as defined by claim 2 wherein Y is phenyl.
4. A compound as defined by claim 2 wherein Y is nitrophenyl.
5. A compound as defined by claim 2 wherein Y is lower alkoxycarbonylphenyl.
6. A compound as defined by claim 2 wherein Y is lower alkoxycarbonylalkyl.
7. A compound as defined by claim 2 wherein Y is lower alkoxycarbonylbenzyl.
8. A compound as defined by claim 1 wherein X is benzyl.
9. A compound as defined by claim 8 wherein Y is lower alkoxycarbonylphenyl.
10. A compound as defined by claim 8 wherein Y is lower alkoxycarbonylalkyl.
11. A compound as defined by claim 8 wherein Y is lower alkoxycarbonylbenzyl.
12. A compound as defined by claim 2 wherein Y is methoxyphenyl.
13. A compound as defined by claim 2 wherein Y is nitroloweralkyl of 1–5 carbon atoms.
14. A compound as defined by claim 2 wherein Y is nitropropyl.

* * * * *